(12) United States Patent
Jo (10) Patent No.: US 7,710,758 B2
(45) Date of Patent: May 4, 2010

(54) MULTICHIP SYSTEM AND METHOD OF TRANSFERRING DATA THEREIN

(75) Inventor: Seong-Kue Jo, Giheung-eup (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 435 days.

(21) Appl. No.: 11/665,635

(22) PCT Filed: Jul. 26, 2005

(86) PCT No.: PCT/KR2005/002416

§ 371 (c)(1),
(2), (4) Date: Apr. 18, 2007

(87) PCT Pub. No.: WO2006/046801

PCT Pub. Date: May 4, 2006

(65) Prior Publication Data
US 2009/0046533 A1 Feb. 19, 2009

(30) Foreign Application Priority Data
Oct. 29, 2004 (KR) .................. 10-2004-0087265

(51) Int. Cl.
*G11C 17/00* (2006.01)
(52) U.S. Cl. .................... 365/103; 365/105
(58) Field of Classification Search ........... 711/103, 711/105, 162; 365/230.03
See application file for complete search history.

(56) References Cited

U.S. PATENT DOCUMENTS

| 5,907,507 | A | 5/1999 | Watanabe et al. |
|---|---|---|---|
| 6,418,506 | B1 | 7/2002 | Pashley et al. |
| 2003/0156454 | A1 | 8/2003 | Wei et al. |
| 2003/0217202 | A1 | 11/2003 | Zilberman et al. |
| 2004/0120206 | A1 | 6/2004 | Kang |
| 2004/0257847 | A1 | 12/2004 | Matsui et al. |
| 2005/0114613 | A1 | 5/2005 | Otani et al. |
| 2006/0294295 | A1* | 12/2006 | Fukuzo .................. 711/105 |
| 2008/0189474 | A1* | 8/2008 | Kim et al. .............. 711/103 |

FOREIGN PATENT DOCUMENTS

| JP | 2003-308691 | 10/2003 |
|---|---|---|
| JP | 2004-005613 | 1/2004 |
| KR | 1997-0059914 | 8/1997 |
| KR | 10-0300895 | 6/2001 |
| KR | 1020010076518 A | 8/2001 |
| KR | 1020040091580 A | 10/2004 |

* cited by examiner

*Primary Examiner*—Vu A Le
(74) *Attorney, Agent, or Firm*—Volentine & Whitt, PLLC

(57) ABSTRACT

Disclosed is a multichip system and method of transferring data between memory chips in direct. The multichip system includes first and second memory chips, and a host system to control operations of the first and second memory chips. The first memory chip controls the second memory chip to transfer data to the second memory chip in response to local transfer information provided from the host system. The first memory chip controls the host system not to access the first and second memory chips while conducting a local transfer operation. According to the invention, since the data is able to be directly transferred between the memory chips without the host system, it enhances the efficiency of the multichip system and improves a data transfer speed.

40 Claims, 8 Drawing Sheets

MULTICHIP SYSTEM AND METHOD OF TRANSFERRING DATA THEREIN

TECHNICAL FIELD

The present invention is concerned with a multichip system, which in particular relates to a multichip system and method of transferring data directly between memory chips thereof.

BACKGROUND ART

A multichip system embeds pluralities of memory chips operable in various applications, and a chipset rendering the memory chips to be usable in correspondence with their applications. The chipset includes a memory interface block with various forms in order to assist operations of the various memory chips in accordance with their usage.

In recent, as the capacity of data is increasing as such multimedia data, it highly demands for a multichip system which contains a memory chip with large storage capacity in a small area and a memory chip with high speedy data rate. Such a multichip system is advantageous to compensating the demerits of the high-density and large-capacity memory chips each other in designing its hardware architecture.

For example, a NAND flash memory chip employs an increment step-pulse programming (ISPP) scheme because it needs to narrow a distribution profile of cell threshold voltages and is conductive with very small cell string currents. Therefore, the NAND flash memory chip has a programming speed very slower than that of a volatile memory chip such as a DRAM chip and an SRAM chip. In order to overcome such a demerit of the NAND flash memory chip in a programming speed, data to be stored in the NAND flash memory chip is preliminarily stored in a volatile memory chip that is operable in a high speed of operation. To the contrary, it is also frequent to store data from a volatile memory chip into a nonvolatile memory chip such as the NAND flash memory chip.

DISCLOSURE OF INVENTION

Technical Problem

In a conventional multichip system, data is transferred between memory chips through a system bus disposed in a host system. In other words, the conventional multichip system transfers data from a source memory chip to a target memory chip by way of loading the data on the system bus by means of a central processing unit and a DMA controller. In the multichip system, data occupies the system bus while the data is being transferred between the memory chips, which makes another operation disabled with the system bus and thereby degrades the efficiency of the multichip system.

On the other hand, a time for transferring data between memory chips in the conventional multichip system results from a sum of a time for storing data into a buffer of the host system from the source memory chip and a time for transferring the data from the buffer to the target memory chip. As a result, in transferring data between memory chips in the system, there is a problem that a data transfer time is so long because data is twice loaded on the system bus of the host system.

Technical Solution

The present invention is directed to a multichip system and method of transferring data in direct between memory chips without accompanying a host system, capable of improving efficiency of the system and enhancing a data transfer speed therein.

A multichip system of the invention comprises: first and second memory chips; and a memory controller regulating operations of the first and second memory chips. The first memory chip controls the second memory chip to make data transferred to the second memory chip in direct in response to local transfer information input from the memory controller.

In this embodiment, it further comprises a memory bus connecting the first and second memory chips in direct. Data is transferred between the first and second memory chips by way of the memory bus.

In this embodiment, the first memory chip comprises: a memory core storing data; an interface unit cooperative to the second memory chip; a control logic unit regulating an operation of the memory core in response to a command input from the interface unit; and a local transfer controller regulating the interface unit to make data transferred to the second memory chip in response to the local transfer information and a local transfer beginning signal input from the control logic unit. The local transfer beginning signal is generated when data stored in the memory core are all transferred to the control logic unit in a local transfer mode.

In another aspect of the invention, a multichip system comprises: first and second memory chips; and first and second memory controllers regulating operations of the first and second memory chips, respectively. The first memory chip controls the second memory chip to make data transferred to the second memory chip in direct in response to local transfer information input from the second memory controller. The first memory chip provides a command to the second memory chip in direct.

In this embodiment, it further comprises a memory bus connecting the first and second memory chips in direct. Data is transferred between the first and second memory chips by way of the memory bus.

In this embodiment, the first memory chip comprises: a memory core storing data; a first interface unit cooperative to the first memory controller; a second interface unit cooperative to the second memory controller and the second memory chip; a control logic unit regulating an operation of the memory core in response to commands input from the first and second interface units; and a local transfer controller regulating the interface unit to make data transferred to the second memory chip in response to the local transfer information and a local transfer beginning signal input from the control logic unit. The local transfer beginning signal is generated when data stored in the memory core are all transferred to the control logic unit in a local transfer mode.

In another aspect of the invention, a multichip system comprises: first and second memory chips; a host system controlling operations of the first and second memory chips; and a memory bus connecting the first and second memory chips with each other in direct. The first memory chip provides a DMA request signal to the host system to disable the host system to access the first and second memory chips during a local transfer mode in response to local transfer information input from the host system, and provides a command to the second memory chip to enable data transferred in direct to the second memory chip by way of the memory bus in response to a DMA approval signal input from the host system.

In this embodiment, the host system comprises: a memory controller regulating operations of the first and second memory chips and providing the local transfer information; and a DMA controller requesting a central processing unit to suspend a use of a system bus in response to the DMA request signal and generating the DMA approval signal from a grant by the central processing unit. The memory controller is disabled in response to the DMA approval signal.

In this embodiment, the first memory chip comprises: a memory core storing data; an interface unit cooperative to the second memory chip; a control logic unit regulating an operation of the memory core in response to a command input from the interface unit; and a local transfer controller generating the DMA request signal in response to the local transfer information and a local transfer beginning signal input from the control logic unit, and regulating the interface unit to make data transferred to the second memory chip in response to the DMA approval signal. The local transfer beginning signal is generated when data stored in the memory core are all transferred to the control logic unit in the local transfer mode.

In another aspect of the invention, a multichip system comprises: first and second memory chips; a memory bus connecting the first and second memory chips with each other in direct; first and second memory controllers regulating operations of the first and second memory chips, respectively; a system bus connecting the first and second memory controllers with each other; and a DMA controller requesting a central processing unit to suspend a use of the system bus in response to a DMA request signal from the first memory chip, and generating the DMA approval signal from a grant by the central processing unit. The first memory chip provides the DMA request signal in response to local transfer information input from the second memory controller, and provides a command to the second memory chip to enable data transferred in direct to the second memory chip by way of the memory bus in response to a DMA approval signal input.

In this embodiment, the first memory chip comprises: a memory core storing data; a first interface unit cooperative to the first memory controller; a second interface unit cooperative to the second memory chip and the second memory chip; a control logic unit regulating an operation of the memory core in response to commands input from the first and second interface units; and a local transfer controller generating the DMA request signal in response to the local transfer information and a local transfer beginning signal input from the control logic unit, and regulating the second interface unit to make data transferred to the second memory chip in response to the DMA approval signal. The local transfer beginning signal is generated when data stored in the memory core are all transferred to the control logic unit in the local transfer mode.

In another embodiment, the first memory chip comprises: a memory core storing data; a first interface unit cooperative to the first memory controller; a second interface unit cooperative to the second memory chip and the second memory chip; a control logic unit regulating an operation of the memory core in response to commands input from the first and second interface units; a selection circuit activating an alternative one of the first and second interface units in response to a fuse option; a local transfer controller generating the DMA request signal in response to the local transfer information and a local transfer beginning signal input from the control logic unit, and regulating the second interface unit to make data transferred to the second memory chip in response to the DMA approval signal; and a tri-state input/output driver connected to the first and second interface units, being enabled in response to the DMA approval signal.

The invention also provides a method of transferring data in a multichip system including a memory controller, and first and second memory chips. The method comprises the steps of: (a) providing local transfer information to the first memory chip from the memory controller; and (b) controlling the second memory chip by the first memory chip to enable data transferred to the second memory chip in response to the local transfer information.

In this embodiment, the step (b) comprises: preparing a data transfer in response to the local transfer information; and confirming whether the data transfer is ready and providing a command to the second memory chip.

Further in another aspect of the invention, a method of transferring data in a multichip system including a host system, first and second memory chips, and a memory bus connecting the first and second memory chips to each other in direct, comprises the steps of: (a) supplying local transfer information to the first memory chip from the host system; and (b) providing a DMA request signal to the host system from the first memory chip in response to the local transfer information, which disables the host system to access the first and second memory chips; and (c) providing a command to the second memory chip from the first memory chip in response to a DMA approval signal input from the host system, which enables data to be transferred to the second memory chip in direct by way of the memory bus.

In this embodiment, the step (c) comprises: preparing a data transfer in response to the local transfer information; and confirming whether the data transfer is ready and providing the command to the second memory chip.

A multichip system and method transferring data therein, according to the invention, improves data transfer speed and performance of the system because data is transferred between memory chips in direct.

Advantageous Effects

As described above, the multichip system according to the invention is able to transfer data between memory chips in direct without accompanying a host system, which improves data transfer speed and efficiency of the host system.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention. In the drawings.

BEST MODE FOR CARRYING OUT THE INVENTION

The preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, it will be described about an exemplary embodiment of the present invention in conjunction with the accompanying drawings.

Figure 1:
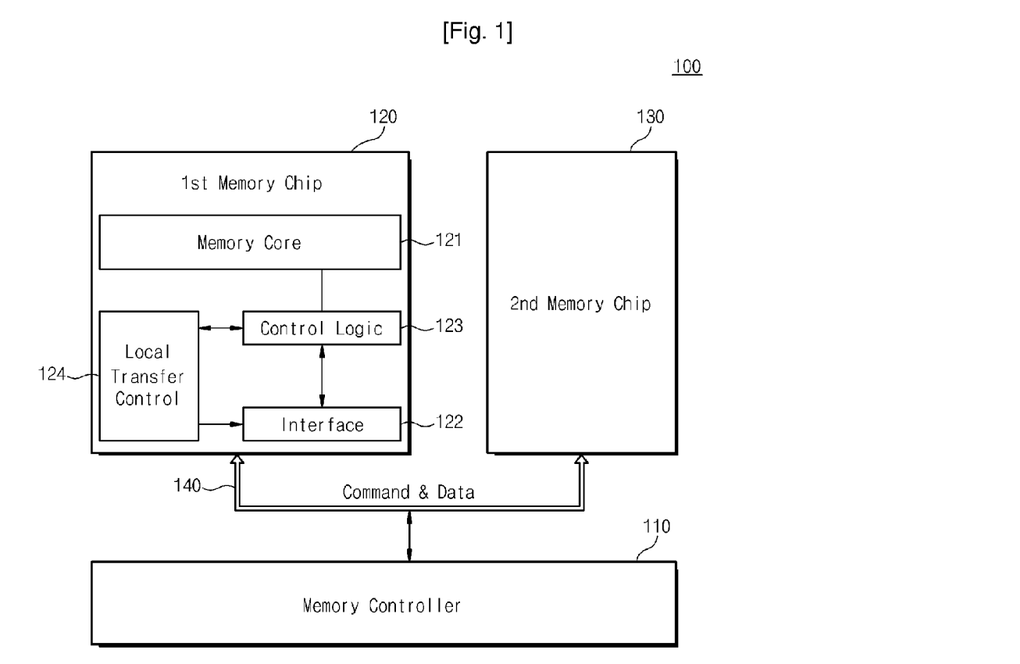
FIGS. 1 through 7 are block diagrams illustrating multichip systems according to embodiments of the invention.

FIG. 1 is a block diagram illustrating multichip systems according to a first embodiment of the invention. Referring to FIG. 1, the multichip system 100 is comprised of a memory controller 110, a first memory chip 120, a second memory chip 130, and a memory bus 140. The first memory chip 120 employs the same interface protocol with the second memory chip 130.

The memory controller 110 provides commands, addresses, and control signals for regulating overall operations of the first and second memory chips during a normal mode. The memory controller 110 provides local transfer information to the first memory chip 120 during a local transfer operation. In the specification of the invention, the local transfer operation means an operation transferring data in direct between the memory chips. The local transfer information includes a local transfer command, source and target addresses, and a data size to be transferred.

The first memory chip 120 controls the second memory chip 130 to make data directly transferred to the second memory chip 130 therefrom in response to the local transfer information input from the memory controller 110. For such an operation, the first memory chip 120 includes a memory core 121, an interface unit 122, a control logic unit 123, and a local transfer controller 124.

The memory core 121 is constructed of plural memory cells to store data. The interface unit 122 is cooperative between the memory controller 110 and the second memory chip 130. The interface unit 122 receives commands, addresses, and control signals from the memory controller 110 in a normal operation, while receives local transfer information from the memory controller 110 in a local transfer operation. The first memory chip 120 controls the second memory chip 130 by way of the interface unit 122.

The control logic unit 123 analyzes a command input from the interface unit 122 and then controls an operation of the memory core 121. The control logic unit 123 reads data from a source address of the memory core 121 by interpreting a local transfer command during the local transfer operation. When data stored in a source address of the memory core 121 has been completely transferred to the control logic unit 123, the control logic unit 123 generates a local transfer beginning signal.

The local transfer controller 124 regulates the interface unit 122 to transfer data from the control logic unit 123 to the second memory chip 130 in response to the local transfer beginning signal. The local transfer controller 124 directly provides a write command to the second memory chip 130 through the interface unit 122.

The multichip system 100 may be more adaptable with the same kind of the first and second memory chips 120 and 130, e.g., those of which are all NAND flash memory chips or DRAM chips.

The first memory chip 120 controls the second memory chip 130 to make data to be transferred to the second memory chip in direct by way of the memory bus 140 in response to the local transfer information provided from the memory controller 110. The multichip system 100 is operable with a data transfer speed remarkably improved because data is transferred between the memory chips in direct.

Figure 2:
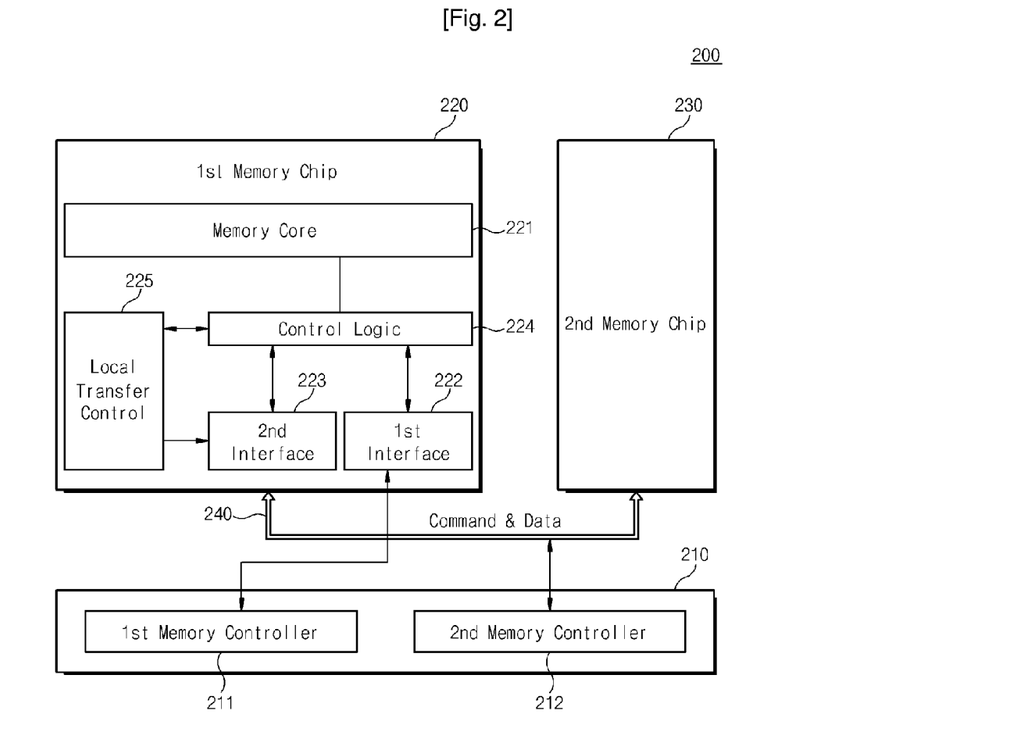

FIG. 2 is a block diagram illustrating a multichip system according to a second embodiment of the invention. Referring to FIG. 2, the multichip system 200 is comprised of a memory controller 210, a first memory chip 220, a second memory chip 230, and a memory bus 240. The first memory chip 220 uses an interface protocol different from that of the second memory chip 230.

The memory controller 210 includes first and second memory controllers 211 and 212. During a normal mode, the first and second memory controllers 211 and 212 regulate operations of the first and second memory chips 220 and 230, respectively. During a local transfer mode, the second memory controller 212 provides local transfer information for the first memory chip 220.

In FIG. 2, the first memory chip 220 is comprised of a memory core 221, a first interface unit 222, a second interface unit 223, a control logic unit 224, and a local transfer controller 225. The first memory chip 220 controls the second memory chip 230, during a local transfer mode, to make data transferred to the second memory chip 230 in direct in response to the local transfer information input from the second memory controller 212.

The first interface unit 222 is cooperatively adaptable with the first memory controller 211. Otherwise, the second interface unit 223 is adaptable with the second memory controller 212 and the second memory chip 230. The control logic unit 224 regulates an operation of the memory core 221 in response to commands input from the first and second interface units 222 and 223. The local transfer controller 225 regulates the second interface unit 223 to make data transferred to the second memory chip 230 in response to the local transfer information and a local transfer beginning signal generated from the control logic 224.

In FIG. 2, the first and second memory chips 220 and 230 are different in kind. For instance, the first memory chip 220 is a NAND flash memory chip, while the second memory chip 230 is a DRAM chip. During a local transfer mode, the NAND flash memory chip controls a DRAM interface unit to make data transferred to the DRAM chip in direct in response to local transfer information input from a DRAM controller.

Figure 3:
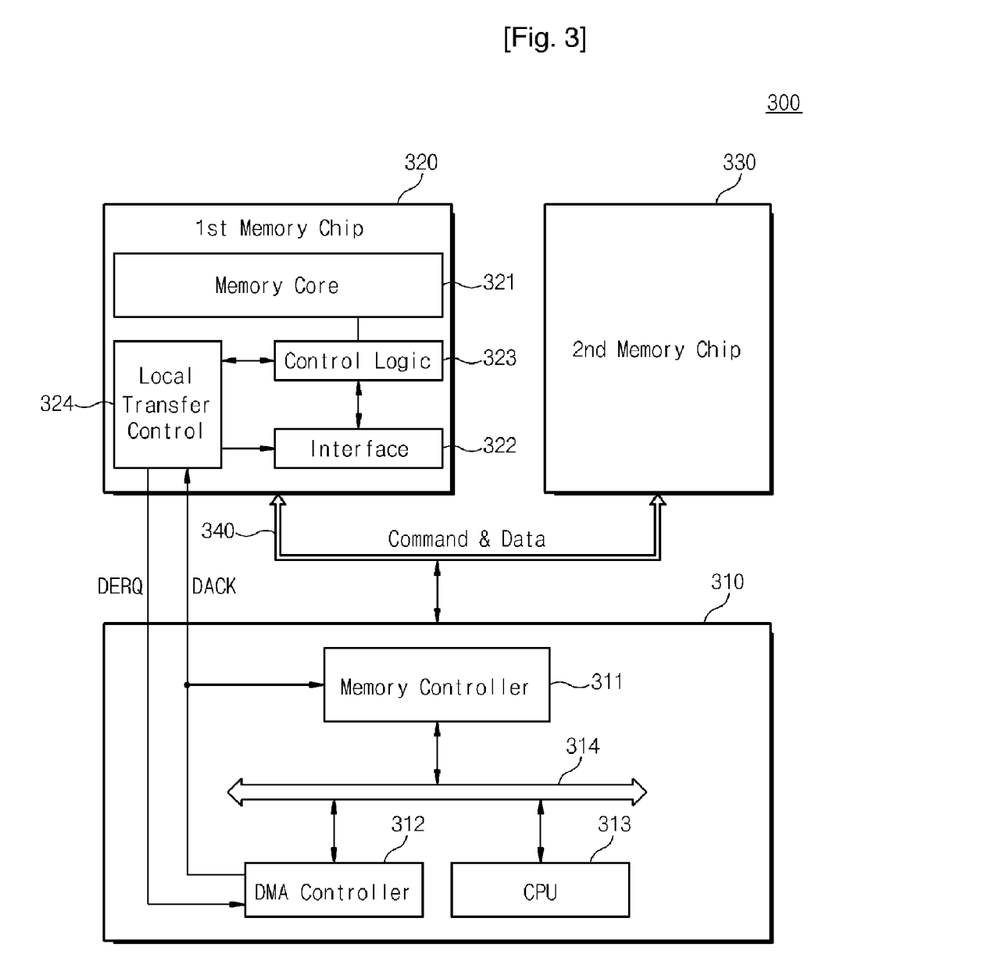

FIG. 3 is a block diagram illustrating a multichip system according to a third embodiment of the invention. Referring to FIG. 3, the multichip system 300 is comprised of a host system 310, a first memory chip 320, a second memory chip 330, and a memory bus 340. The first memory chip 320 uses the same protocol with the second memory chip 330.

The host system 310 includes a memory controller 311, a DMA controller 312, a central processing unit CPU 313, and a system bus 314. The memory controller 311 regulates overall operations of the first and second memory chips 320 and 330. The memory controller 311 provides local transfer information to the first memory chip 320 from the CPU 313 during a local transfer mode. The first memory chip 320 generates a DMA request signal DREQ in response to the local transfer information.

The DMA controller 312 receives the DMA request signal DREQ from the first memory chip 320 and requests the CPU 313 to suspend using the system bus 314. When the CPU 313 grants the request for suspending, the DMA controller 312 generates a DMA approval signal DACK. With generation of the DMA approval signal DACK, the memory controller 311 is disabled to access the first and second memory chips 320 and 330.

The first memory chip 320 includes a local transfer controller 324. The local transfer controller 324 generates the DMA request signal DREQ in response to a local transfer beginning signal input from the control logic unit 323. Then, responding to the DMA approval signal DACK from the DMA controller 312, the interface unit 322 is controlled to make data transferred to the second memory chip 330 from the first memory chip 320.

The multichip system 300 regulates the host system 310 not to access the first and second memory chips 320 and 330 while a local transfer mode is being active. Therefore, the multichip system 300 is able to conduct the local transfer operation without accompanying the host system 310. The multichip system 300 is more preferably operable when the first and second memory chips 320 and 330 are the same memory chips in kind.

Figure 4:
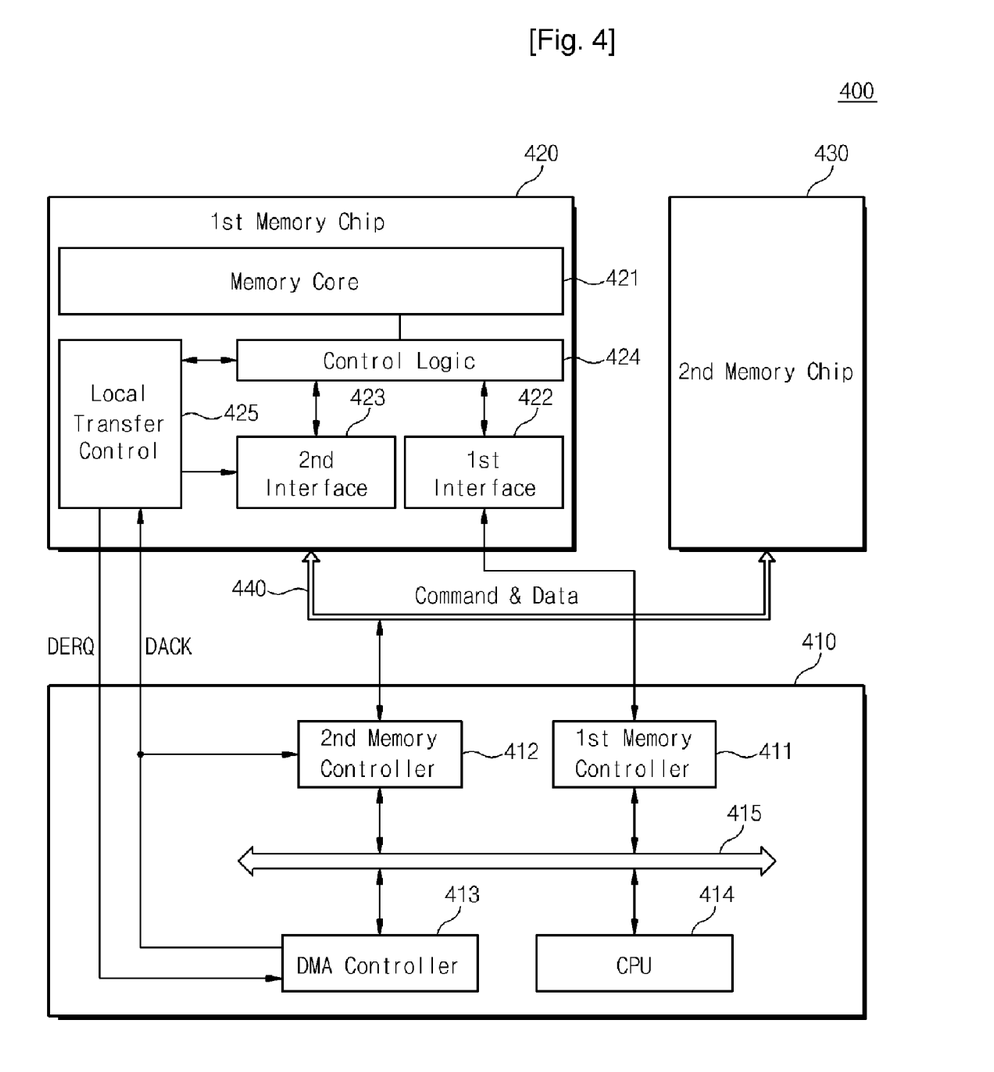

FIG. 4 is a block diagram illustrating a multichip system according to a fourth embodiment of the invention. Referring to FIG. 4, the multichip system 400 is comprised of a host system 410, a first memory chip 420, a second memory chip 430, and a memory bus 440. The multichip system 400 may be used in the condition that the first and second memory chips 420 and 430 are operable with interface protocols different from each other.

The host system 410 includes first and second memory controllers 411 and 412. The first memory chip 420 includes first and second interface units 422 and 423. The first interface unit 422 is cooperative with the first memory controller 411 during a normal mode, while the second interface unit 423 is cooperative with the second memory controller 412 and the second memory chip 430.

Figure 5:
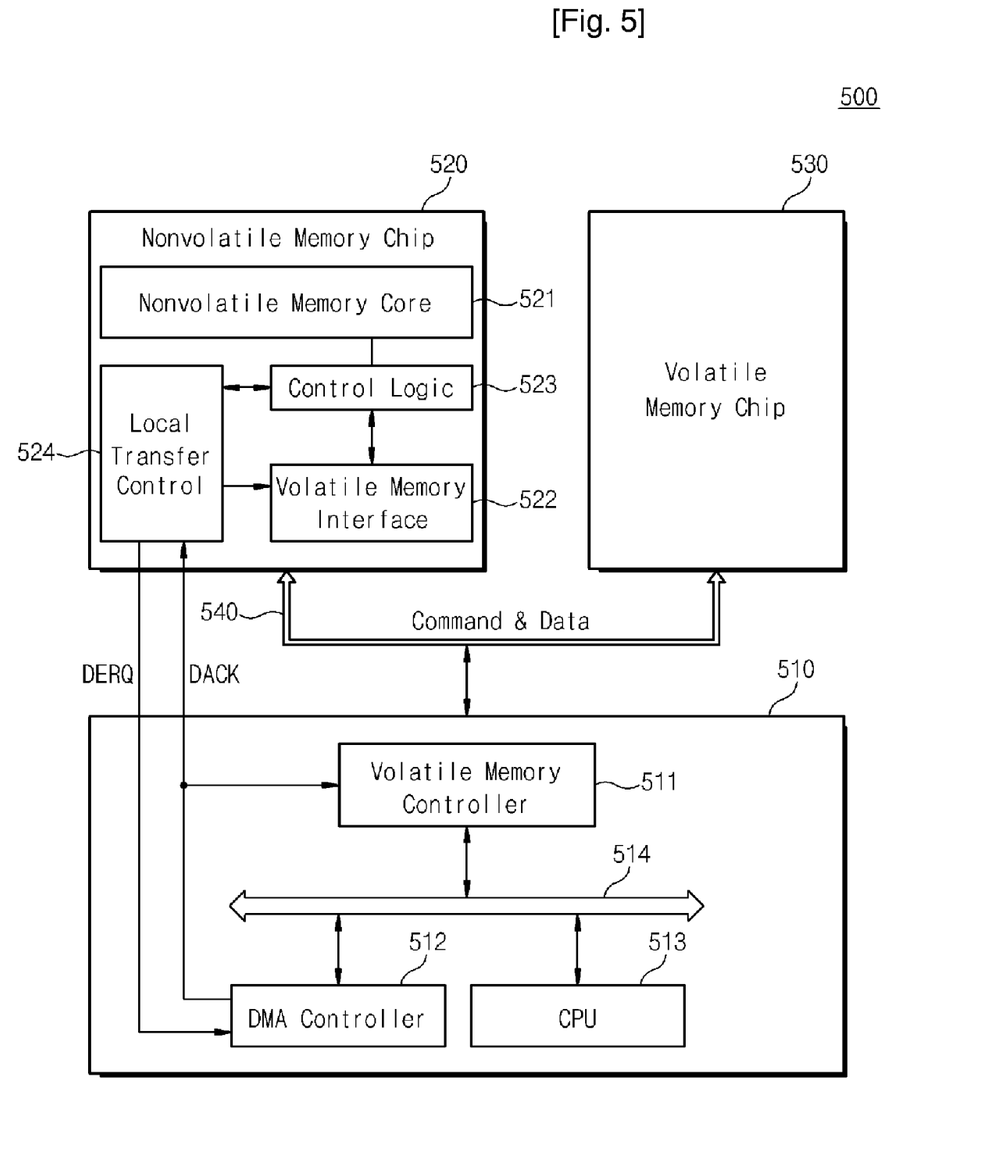

FIG. 5 is a block diagram illustrating a multichip system according to a fourth embodiment of the invention. Referring to FIG. 5, the multichip system 500 is comprised of a host system 510, a nonvolatile memory chip 520, a volatile memory chip 530, and a memory bus 540. The nonvolatile memory chip 520 uses an interface protocol as same as the volatile memory chip 530.

The host system 510 includes a volatile memory controller 511, while the nonvolatile memory chip 520 includes a volatile memory interface unit 522. The volatile interface unit 522 is adaptively operable with the volatile memory controller 511 and the volatile memory chip 520. The multichip system 500 is able to transfer commands and data in direct between the nonvolatile memory chip 520 and the volatile memory chip 530 by way of the memory bus 540.

Figure 6:
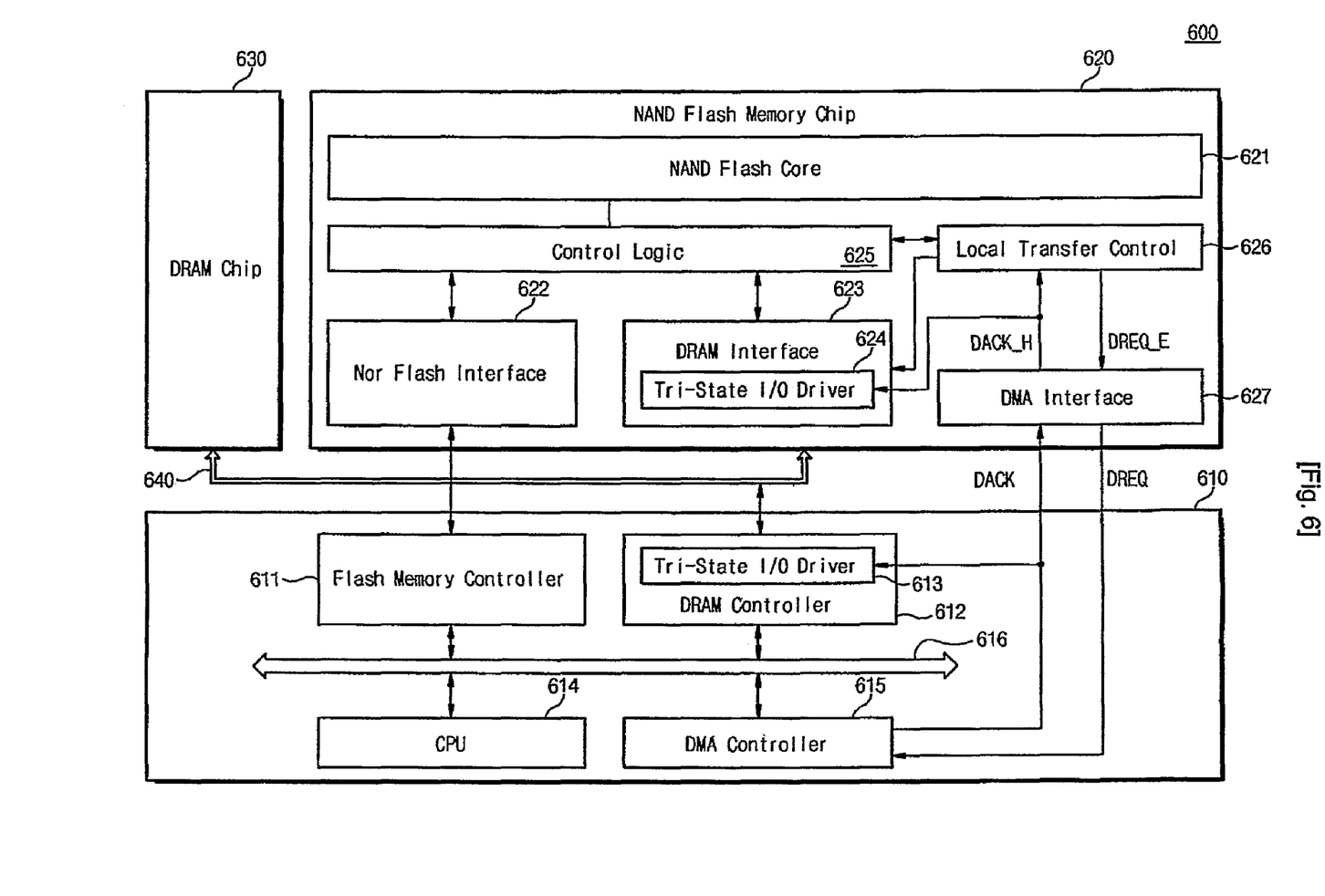

FIG. 6 is a block diagram illustrating a multichip system according to a sixth embodiment of the invention. Referring to FIG. 6, the multichip system 600 is comprised of a host system 610, a NAND flash memory chip 620, a DRAM chip 630, a memory bus 640. In the multichip system 600, it is able to transfer data to the DRAM chip 630 from the NAND flash memory chip 620 in direct by means of a DRAM interface scheme during a local transfer mode.

The host system 610 includes a flash memory controller 611 and a DRAM controller 612. The DRAM controller 612 is associated with a tri-state input/output driver 613. The tri-state input/output driver 613 is forced to be a floating state in response to a DMA approval signal generated from the DMA controller 615. Therefore, the DRAM controller 612 is regulated not to access the NAND flash memory chip 620 and the DRAM chip 630 during a local transfer mode. It will be described in detail about the structure and operation of the tri-state input/output driver 613 with reference to FIG. 8 later.

The flash memory controller 611 regulates an operation of the NAND flash memory chip 620. The DRAM controller 612 regulates an operation of the DRAM chip 630 in the normal mode, while regulates an operation of the NAND flash memory chip 620 in the local transfer mode.

The NAND flash memory chip 620 is comprised of a NOR flash interface unit 622, a DRAM interface unit 623, a local transfer controller 626, and a DMA interface unit 627. The NOR interface unit 622 receives commands, addresses, data, and control signals from the flash memory controller 611 through pads (not shown). The DRAM interface unit 623 receives local transfer information from the DRAM controller 612 by way of the tri-state input/output driver 624. The tri-state input/output driver 624 is configured of a tri-state buffer that receives a command while inputs and outputs data. It will be described in detail about the structure and operation of the tri-state input/output driver 624 with reference to FIG. 9 later.

The local transfer controller 626 receives a local transfer beginning signal from the control logic unit 625 and then generates a DMA request enable signal DREQ_E, during the local transfer mode. The DMA interface unit 627 generates a DMA request signal DREQ in response to the DMA request enable signal DREQ_E. Further, the DMA interface unit 627 receives a DMA approval signal DACK from the host system 610 and then generates a DMA host approval signal DACK_H. The local transfer controller 626 regulates the DRAM interface unit 623 to make commands and data transferred to the DRAM chip 630 in direct in response to the DMA host approval signal DACK_H. During this, the tri-state input/output driver 624 is conditioned in a data output state.

The multichip system 600 includes the NOR flash interface unit 622 and the DRAM interface unit 623, being able to transfer commands and data to the DRAM chip 630 through the DRAM interface unit 623.

Figure 7:
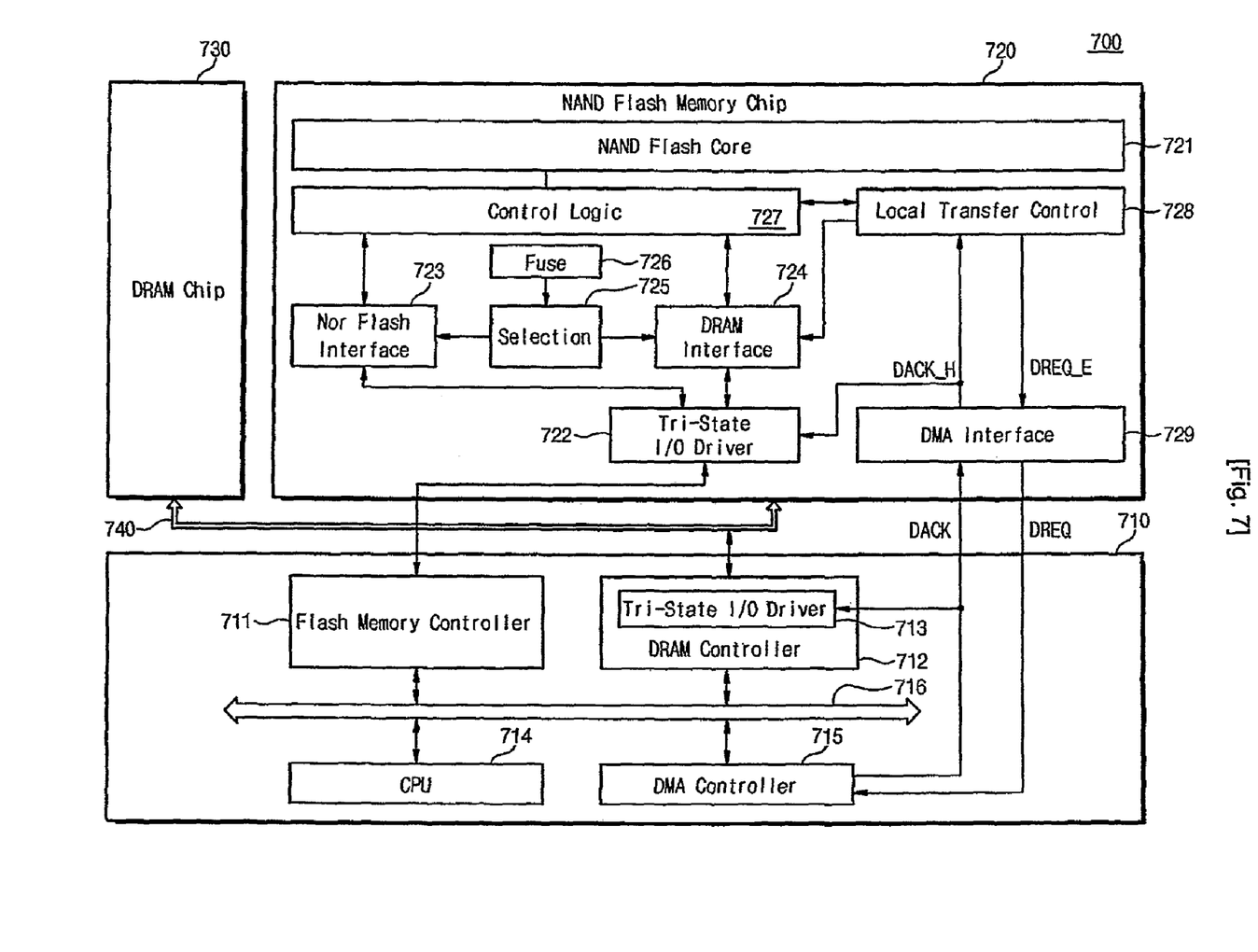

FIG. 7 is a block diagram illustrating a multichip system according to a seventh embodiment of the invention. Referring to FIG. 7, the multichip system 700 is comprised of a host system 710, a NAND flash memory chip 720, a DRAM chip 730, a memory bus 740. In the multichip system 700, the NAND flash memory chip 720 includes a fuse box 726 and a selection circuit 725. A tri-state input/output driver 722 is selectively conductive by a NOR interface unit 723 or the DRAM interface unit 724 in compliance with a fuse option that has been set preliminarily.

The multichip system 700 is able to reduce the number of input/output pins that is used in the multichip system 600 shown in FIG. 6. In other words, the number of input/output pins in the multichip system 700 can be more reduced because the NOR flash and DRAM interface units, 723 and 724, share the tri-state input/output driver 722.

Figure 8:
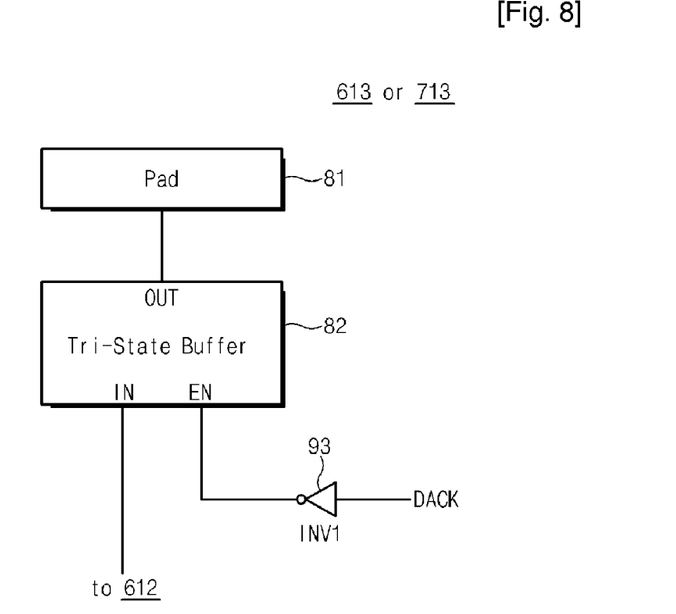
FIG. 8 is a block diagram illustrating one of tri-state input/output drivers included in the DRAM controller shown in FIG. 6 or 7.

FIG. 8 is a block diagram illustrating one of the tri-state input/output drivers, 613 or 713, included in the DRAM controller shown in FIG. 6 or 7. Referring to FIG. 8, the tri-state input/output driver 613 or 713 is comprised of a pad 81, a tri-state buffer 82, and an inverter (INV1) 83. An output terminal OUT of the tri-state buffer 82 is connected to the pad 81, and its enable node EN is connected to an output terminal of the inverter 83. The inverter 83 receives the DMA approval signal DACK. When the DMA approval signal DACK goes to high level, the tri-state buffer 82 is conditioned in a floating state.

During the local transfer operation mode, the NAND flash memory chip 620 or 720 (refer to FIG. 6 or 7) controls the DRAM chip 630 or 730. In other words, address and control pins of the DRAM chip 630 or 730 are driven by the NAND flash memory chip 620 or 720. Therefore, during the local transfer mode, the DRAM controller 612 or 712 does not need to access the DRAM chip 630 or 730. As a result, the tri-state buffer 82 is conditioned in a floating state when the DMA approval signal DACK becomes high level.

Figure 9:
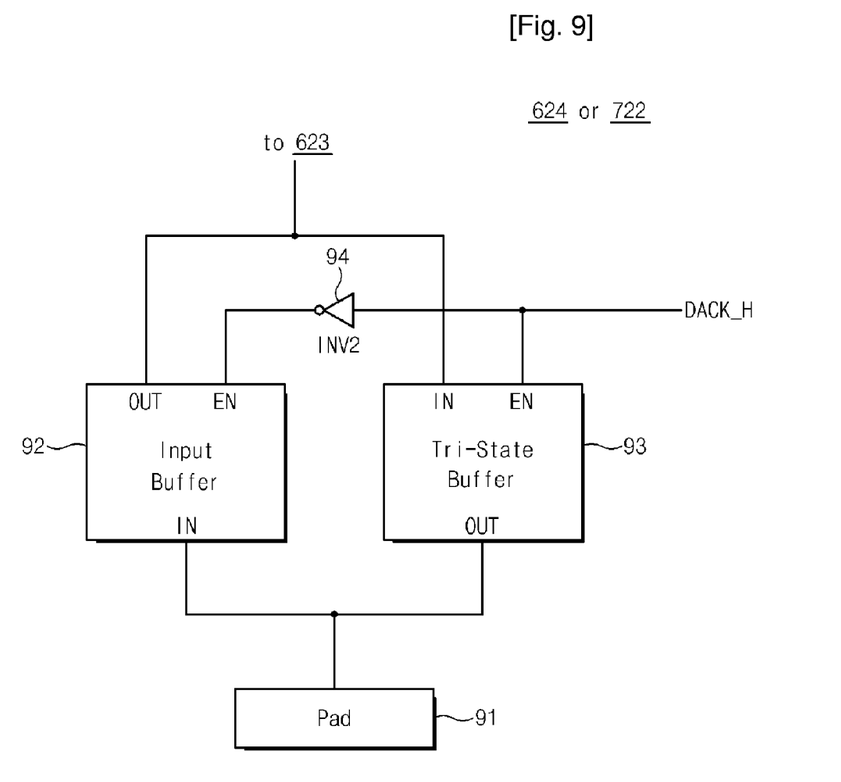
FIG. 9 s a block diagram illustrating the other of tri-state input/output drivers included in the DRAM controller shown in FIG. 6 or 7.

FIG. 9 s a block diagram illustrating the other one of the tri-state input/output drivers, 624 or 724, included in the DRAM controller shown in FIG. 6 or 7. Referring to FIG. 9, the tri-state input/output driver 624 or 724 is comprised of a pad 91, an input buffer 92, a tri-state buffer 93, and an inverter (INV2) 94.

An input terminal IN of the input buffer 92 is connected to the pad 91, its output terminal OUT is connected to the DRAM interface unit 623 or 724, or the NOR flash interface unit 723. An enable node EN of the input buffer 92 is connected to an output terminal of the inverter 94. The inverter 94 receives the DMA host approval signal DACK_H.

An output terminal OUT of the tri-state buffer 93 is connected to the pad 91, and its input terminal IN is connected to the DRAM interface unit 623 or 724, or the NOR flash interface unit 723. An enable node EN of the tri-state buffer 93 receives the DMA host approval signal DACK_H.

When the DMA host approval signal DACK_H is being on low level, the tri-state buffer 93 is conditioned in a floating state. Otherwise, the DMA host approval signal DACK_H is being on high level, the tri-state buffer 93 drives the pad 91 in response to an input signal applied thereto.

During the local transfer operation mode, the DMA host approval signal DACK_H goes to high level. Therefore, the NAND flash memory chip 620 or 720 (refer to FIG. 6 or 7) is able to directly drive address and control pads of the DRAM chip 630 or 730.

Figure 10:
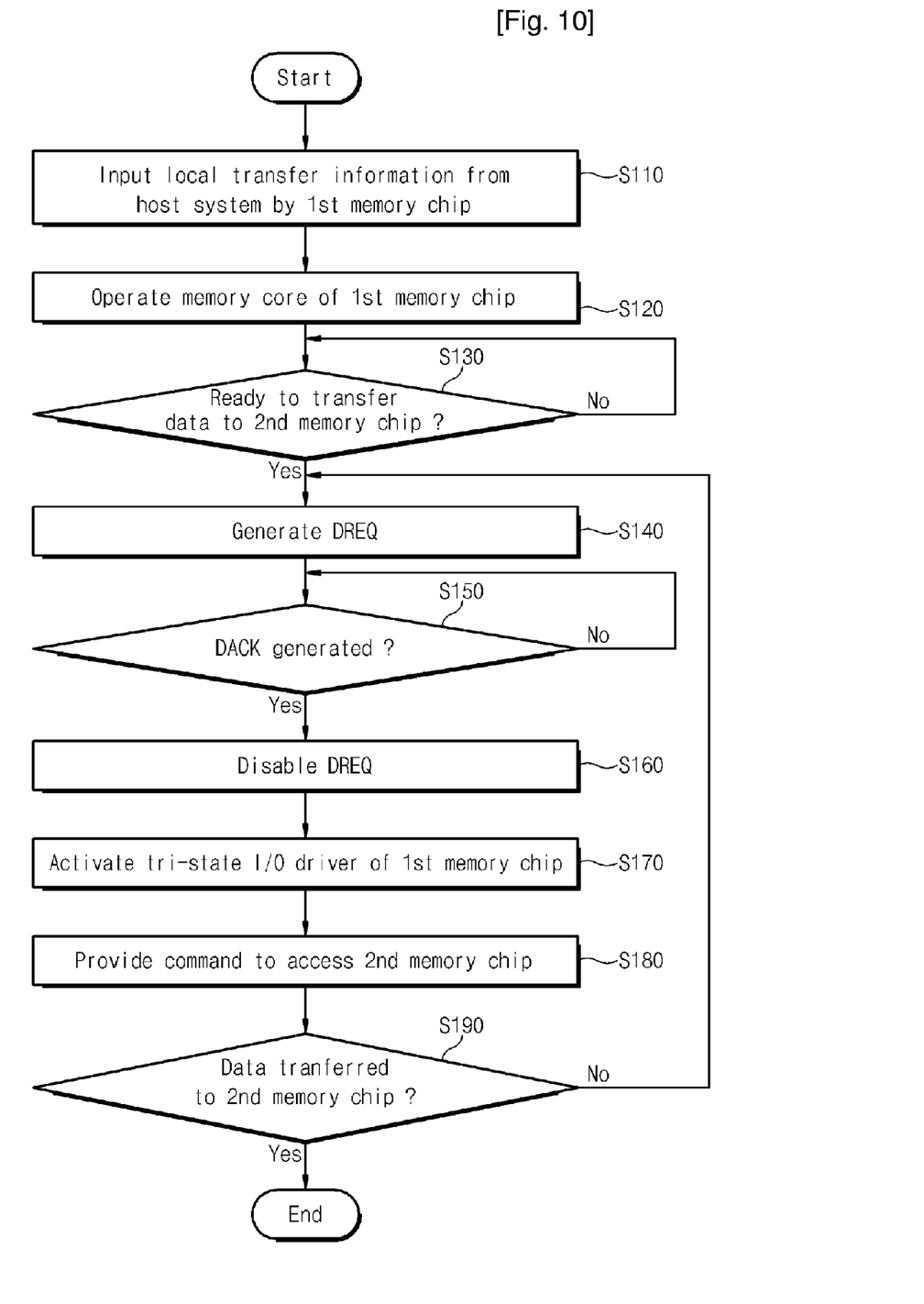
FIG. 10 is a flow chart showing a method of transferring data in the multichip system, according to the invention.

FIG. 10 is a flow chart showing a method of transferring data in the multichip system that includes the first and second memory chips, and the host system controlling operations of the first and second memory chips, according to the invention.

First, in step S110, the first memory chip receives the local transfer information from the host system. Here, the local transfer information contains a local transfer command, source and target addresses, and a data size to be transferred.

In step S120, the memory core of the first memory chip is activated in response to the local transfer command. In other words, the first memory chip reads data from the source address of the memory core.

In step S130, the local transfer controller of the first memory chip confirms whether it is ready to transfer data to the second memory chip. In other words, the local transfer controller checks out whether data has been all transferred to the control logic unit from the memory core of the first memory chip. If it is ready to transfer data, the control logic unit generates the local transfer beginning signal.

In step S140, the first memory chip generates the DMA request signal DREQ in response to preparation of data to be transferred. The DMA request signal DREQ is applied to the DMA controller included in the host system. The DMA controller requests bus occupation of the system bus in response to the DMA request signal DREQ.

In step S150, the first memory chip confirms whether the DMA approval signal DACK has been generated. The DMA controller generates the DMA approval signal when the bus occupation of the system bus is granted for data to be transferred. If the DMA approval signal DACK is generated, the host system in prohibited to access the first and second memory chips.

In step S160, the first memory chip receives the DMA approval signal DACK and disables the DMA request signal DREQ.

In step S170, the first memory chip activates the tri-state input/output driver in response to the DMA approval signal DACK, enabling data to be ready for output.

In step S1180, the first memory chip provides a command for the second memory chip, which enables the second memory chip to be accessed.

In step S190, the first memory chip transfers data to the second memory chip by way of the memory bus. During this, the data can be divisionally transferred with pluralities of small units. And, the small-unit data transmission is repeated by the steps S140 through S190. If all data are completely transferred, the local transfer mode is terminated.

The method of transferring data in the multichip system according to the invention is efficient to improving a data transfer speed and the performance of the system because data is transferred between the memory chips in direct.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

The invention claimed is:

1. A multichip system comprising:
    first and second memory chips; and
    a memory controller regulating operations of the first and second memory chips,
    wherein the first memory chip controls the second memory chip to make data transferred to the second memory chip in direct in response to local transfer information input from the memory controller.

2. The multichip system as set forth in claim 1, wherein the first memory chip provides a command to the second memory chip in direct.

3. The multichip system as set forth in claim 1, which further comprises a memory bus connecting the first and second memory chips in direct,
    wherein data is transferred between the first and second memory chips by way of the memory bus.

4. The multichip system as set forth in claim 1, wherein the local transfer information includes a local transfer command, source and target addresses, and a data size to be transferred.

5. The multichip system as set forth in claim 1, wherein the first memory chip comprises:
    a memory core storing data;
    an interface unit cooperative to the second memory chip;
    a control logic unit regulating an operation of the memory core in response to a command input from the interface unit; and
    a local transfer controller regulating the interface unit to make data transferred to the second memory chip in response to the local transfer information and a local transfer beginning signal input from the control logic unit.

6. The multichip system as set forth in claim 5, wherein the local transfer beginning signal is generated when data stored in the memory core are all transferred to the control logic unit in a local transfer mode.

7. The multichip system as set forth in claim 5, wherein the first and second memory chips are same in kind.

8. A multichip system comprising:
    first and second memory chips; and
    first and second memory controllers regulating operations of the first and second memory chips, respectively,
    wherein the first memory chip controls the second memory chip to make data transferred to the second memory chip in direct in response to local transfer information input from the second memory controller in a local transfer mode.

9. The multichip system as set forth in claim 8, wherein the first memory chip provides a command to the second memory chip in direct.

10. The multichip system as set forth in claim 8, which further comprises a memory bus connecting the first and second memory chips in direct, wherein data is transferred between the first and second memory chips by way of the memory bus.

11. The multichip system as set forth in claim 8, wherein the local transfer information includes a local transfer command, source and target addresses, and a data size to be transferred.

12. The multichip system as set forth in claim 8, wherein the first memory chip comprises:
   a memory core storing data;
   a first interface unit cooperative to the first memory controller;
   a second interface unit cooperative to the second memory controller and the second memory chip;
   a control logic unit regulating an operation of the memory core in response to commands input from the first and second interface units; and
   a local transfer controller regulating the interface unit to make data transferred to the second memory chip in response to the local transfer information and
   a local transfer beginning signal input from the control logic unit.

13. The multichip system as set forth in claim 12, wherein the local transfer beginning signal is generated when data stored in the memory core are all transferred to the control logic unit in a local transfer mode.

14. The multichip system as set forth in claim 12, wherein the first and second memory chips are different from each other in kind.

15. A multichip system comprising:
   first and second memory chips;
   a host system controlling operations of the first and second memory chips; and
   a memory bus connecting the first and second memory chips with each other in direct,
   wherein the first memory chip provides a DMA request signal to the host system to disable the host system to access the first and second memory chips during a local transfer mode in response to local transfer information input from the host system, and provides a command to the second memory chip to enable data transferred in direct to the second memory chip by way of the memory bus in response to a DMA approval signal input from the host system.

16. The multichip system as set forth in claim 15, wherein the host system comprises:
   a memory controller regulating operations of the first and second memory chips and providing the local transfer information; and
   a DMA controller requesting a central processing unit to suspend a use of a system bus in response to the DMA request signal and generating the DMA approval signal from a grant by the central processing unit.

17. The multichip system as set forth in claim 16, wherein the memory controller is disabled to control operations of the first and second memory chips when the DMA approval signal is generated.

18. The multichip system as set forth in claim 16, wherein the memory controller comprises a tri-state buffer that is connected to a pad and conditioned in a floating state in response to the DMA approval signal.

19. The multichip system as set forth in claim 16, wherein the first memory chip comprises:
   a memory core storing data;
   an interface unit cooperative to the second memory chip;
   a control logic unit regulating an operation of the memory core in response to a command input from the interface unit; and
   a local transfer controller generating the DMA request signal in response to the local transfer information and a local transfer beginning signal input from the control logic unit, and regulating the interface unit to make data transferred to the second memory chip in response to the DMA approval signal.

20. The multichip system as set forth in claim 19, wherein the local transfer beginning signal is generated when data stored in the memory core are all transferred to the control logic unit in the local transfer mode.

21. The multichip system as set forth in claim 16, wherein the first and second memory chips are same in kind.

22. A multichip system comprising:
   first and second memory chips;
   a memory bus connecting the first and second memory chips with each other in direct;
   first and second memory controllers regulating operations of the first and second memory chips, respectively;
   a system bus connecting the first and second memory controllers with each other; and
   a DMA controller requesting a central processing unit to suspend a use of the system bus in response to a DMA request signal from the first memory chip, and generating the DMA approval signal from a grant by the central processing unit, wherein the first memory chip provides the DMA request signal in response to local transfer information input from the second memory controller, and provides a command to the second memory chip to enable data transferred in direct to the second memory chip by way of the memory bus in response to a DMA approval signal input.

23. The multichip system as set forth in claim 22, wherein the second memory controller comprises a tri-state buffer that is connected to a pad and conditioned in a floating state in response to the DMA approval signal.

24. The multichip system as set forth in claim 22, wherein the first memory chip comprises:
   a memory core storing data;
   a first interface unit cooperative to the first memory controller;
   a second interface unit cooperative to the second memory chip and the second memory chip;
   a control logic unit regulating an operation of the memory core in response to commands input from the first and second interface units; and
   a local transfer controller generating the DMA request signal in response to the local transfer information and a local transfer beginning signal input from the control logic unit, and regulating the second interface unit to make data transferred to the second memory chip in response to the DMA approval signal.

25. The multichip system as set forth in claim 24, wherein the local transfer beginning signal is generated when data stored in the memory core are all transferred to the control logic unit in the local transfer mode.

26. The multichip system as set forth in claim 24, wherein the second interface unit comprises a tri-state buffer that is connected to a pad and enabled in response to the DMA approval signal.

27. The multichip system as set forth in claim 22, wherein the first and second memory chips are different in kind.

28. The multichip system as set forth in claim 22, wherein the first memory chip is a nonvolatile memory chip and the second memory chip is a volatile memory chip.

29. The multichip system as set forth in claim 22, wherein the first memory chip is a NAND flash memory chip; the second memory chip is a DRAM chip; the first memory controller is a flash memory controller; and the second memory controller is a DRAM controller.

30. The multichip system as set forth in claim 22, wherein the first memory chip comprises:
   a memory core storing data;
   a first interface unit cooperative to the first memory controller;
   a second interface unit cooperative to the second memory chip and the second memory chip;
   a control logic unit regulating an operation of the memory core in response to commands input from the first and second interface units;
   a selection circuit activating an alternative one of the first and second interface units in response to a fuse option;
   a local transfer controller generating the DMA request signal in response to the local transfer information and a local transfer beginning signal input from the control logic unit, and regulating the second interface unit to make data transferred to the second memory chip in response to the DMA approval signal; and
   a tri-state input/output driver connected to the first and second interface units, being enabled in response to the DMA approval signal.

31. The multichip system as set forth in claim 30, wherein the second interface unit comprises a tri-state buffer that is connected to a pad and conditioned on a floating state in response to the DMA approval signal.

32. The multichip system as set forth in claim 30, wherein the first memory chip is a NAND flash memory chip; the second memory chip is a DRAM chip; the first interface unit is a NOR flash interface unit; and the second interface unit is a DRAM interface unit.

33. A method of transferring data in a multichip system including a memory controller, and first and second memory chips, the method comprising the steps of:
   (a) providing local transfer information to the first memory chip from the memory controller; and
   (b) controlling the second memory chip by the first memory chip to enable data transferred to the second memory chip in response to the local transfer information.

34. The method as set forth in claim 33, wherein the step (b) comprises:
   preparing a data transfer in response to the local transfer information; and
   confirming whether the data transfer is ready and providing a command to the second memory chip.

35. The method as set forth in claim 33, which further comprises transferring data to the second memory chip from the first memory chip by way of a memory bus connecting the first and second memory chips with each other in direct.

36. The method as set forth in claim 33, wherein the local transfer information contains a local transfer command, source and target addresses, and a data size to be transferred.

37. A method of transferring data in a multichip system including a host system, first and second memory chips, and a memory bus connecting the first and second memory chips to each other in direct, the method comprising the steps of:
   (a) supplying local transfer information to the first memory chip from the host system; and
   (b) providing a DMA request signal to the host system from the first memory chip in response to the local transfer information, which disables the host system to access the first and second memory chips; and
   (c) providing a command to the second memory chip from the first memory chip in response to a DMA approval signal input from the host system, which enables data to be transferred to the second memory chip in direct by way of the memory bus.

38. The method as set forth in claim 37, wherein the step (c) comprises:
   preparing a data transfer in response to the local transfer information; and
   confirming whether the data transfer is ready and providing the command to the second memory chip.

39. The method as set forth in claim 37, which further comprises transferring data to the second memory chip from the first memory chip by way of the memory bus connecting the first and second memory chips with each other in direct.

40. The method as set forth in claim 37, wherein the local transfer information contains a local transfer command, source and target addresses, and a data size to be transferred.

* * * * *